(12) United States Patent
Waki et al.

(10) Patent No.: US 9,034,290 B2
(45) Date of Patent: *May 19, 2015

(54) PROCESSES FOR PRODUCING PHOSPHORUS PENTAFLUORIDE AND PHOSPHATE HEXAFLUORIDE

(75) Inventors: Masahide Waki, Osaka (JP); Shinji Hashiguchi, Osaka (JP); Kazutaka Hirano, Osaka (JP)

(73) Assignee: STELLA CHEMIFA CORPORATION, Osaka (JP)

( * ) Notice: Subject to any disclaimer, the term of this patent is extended or adjusted under 35 U.S.C. 154(b) by 1472 days.

This patent is subject to a terminal disclaimer.

(21) Appl. No.: 12/673,058

(22) PCT Filed: Aug. 11, 2008

(86) PCT No.: PCT/JP2008/064392
§ 371 (c)(1),
(2), (4) Date: Aug. 15, 2011

(87) PCT Pub. No.: WO2009/022676
PCT Pub. Date: Feb. 19, 2009

(65) Prior Publication Data
US 2011/0286905 A1 Nov. 24, 2011

(30) Foreign Application Priority Data

Aug. 16, 2007 (JP) ................. 2007-212277
Jan. 18, 2008 (JP) ................. 2008-009484

(51) Int. Cl.
*C01B 25/10* (2006.01)
*H01M 10/04* (2006.01)
(Continued)

(52) U.S. Cl.
CPC .......... *H01M 10/0427* (2013.01); *H01M 4/582* (2013.01); *C01B 25/10* (2013.01);
(Continued)

(58) Field of Classification Search
None
See application file for complete search history.

(56) References Cited

U.S. PATENT DOCUMENTS 2,488,298 A   11/1949  Lange et al.
2,488,299 A * 11/1949  Lange et al. ................ 423/301
(Continued)

FOREIGN PATENT DOCUMENTS

CN   1188072 A    7/1998
CN   1317445 A   10/2001
(Continued)

OTHER PUBLICATIONS

Office Action mailed Jul. 24, 2012 in corresponding Japanese Paten Application No. 2008-009484.
(Continued)

*Primary Examiner* — Wayne Langel
(74) *Attorney, Agent, or Firm* — Knobbe Martens Olson & Bear LLP

(57) ABSTRACT

An object the invention is to provide a phosphorus pentafluoride producing process wherein phosphorus pentafluoride is separated/extracted from a pentavalent phosphorus compound or a solution thereof, or a composition obtained by allowing the pentavalent phosphorus compound or the solution thereof to react with hydrogen fluoride, thereby producing phosphorus pentafluoride; and a phosphate hexafluoride producing process wherein the resultant phosphorus pentafluoride is used as raw material to produce a phosphate hexafluoride high in purity. The present invention relates to a process for producing phosphorus pentafluoride, wherein a carrier gas is brought into contact with either of the following one: a pentavalent phosphorus compound, a solution thereof, or a solution in which a composition obtained by allowing the pentavalent phosphorus compound or the solution thereof to react with hydrogen fluoride is dissolved, thereby a phosphorus pentafluoride is extracted into the career gas.

15 Claims, 3 Drawing Sheets (a)

BUBBLING

(51) Int. Cl.
   *H01M 4/58*       (2010.01)
   *C01B 25/455*     (2006.01)
   *H01M 10/0568*    (2010.01)
   *H01M 6/04*       (2006.01)
   *H01M 6/14*       (2006.01)
   *H01M 10/44*      (2006.01)

(52) U.S. Cl.
   CPC ........ *C01B 25/455* (2013.01); *H01M 10/0413* (2013.01); *H01M 10/0468* (2013.01); *H01M 10/0568* (2013.01); *H01M 10/44* (2013.01)

(56) References Cited

U.S. PATENT DOCUMENTS

| | | | |
|---|---|---|---|
| 3,216,799 A | 11/1965 | Olstowki | |
| 3,584,999 A | 6/1971 | Wiesboeck et al. | |
| 3,594,402 A | 7/1971 | Wiesboeck | |
| 3,607,020 A * | 9/1971 | Smith, Jr. | 423/301 |
| 3,634,034 A * | 1/1972 | Nickerson et al. | 423/301 |
| 4,416,785 A | 11/1983 | Menke et al. | |
| 5,378,445 A | 1/1995 | Salmon et al. | |
| 5,935,541 A | 8/1999 | Bonnet et al. | |
| 6,197,205 B1 | 3/2001 | Tsujioka et al. | |
| 6,387,340 B1 * | 5/2002 | Na et al. | 423/301 |
| 6,514,474 B1 * | 2/2003 | Kikuyama et al. | 423/301 |
| 6,645,451 B1 | 11/2003 | Schulz et al. | |
| 8,097,360 B2 | 1/2012 | Oe et al. | |
| 8,470,278 B2 * | 6/2013 | Waki et al. | 423/301 |
| 2001/0041158 A1 * | 11/2001 | Smith et al. | 423/301 |
| 2003/0143145 A1 | 7/2003 | Kikuyama et al. | |
| 2006/0019164 A1 | 1/2006 | Bonhomme et al. | |
| 2010/0233057 A1 | 9/2010 | Luly et al. | |
| 2010/0322838 A1 | 12/2010 | Waki et al. | |
| 2011/0097626 A1 | 4/2011 | Waki et al. | |
| 2011/0189538 A1 | 8/2011 | Waki et al. | |
| 2011/0286905 A1 | 11/2011 | Waki et al. | |

FOREIGN PATENT DOCUMENTS

| | | |
|---|---|---|
| CN | 101142703 A | 3/2008 |
| DE | 290889 A5 | 10/1983 |
| DE | 10027211 | 12/2001 |
| DE | 10027211 A1 * | 12/2001 |
| EP | 94822 A1 | 11/1983 |
| EP | 0 846 657 A1 | 6/1998 |
| FR | 2082502 | 12/1971 |
| GB | 1298159 | 11/1972 |
| JP | 46-003210 A | 10/1971 |
| JP | 50-013760 | 5/1975 |
| JP | 60-251109 A | 12/1985 |
| JP | 64-072901 A | 3/1989 |
| JP | 04-175216 | 6/1992 |
| JP | 2987713 B2 | 6/1992 |
| JP | 04-265213 A | 9/1992 |
| JP | 05-279003 A | 10/1993 |
| JP | 06-056413 A | 3/1994 |
| JP | 7-81903 A | 3/1995 |
| JP | 09-165210 A | 6/1997 |
| JP | 10-245211 | 9/1998 |
| JP | 10-316409 | 12/1998 |
| JP | 10-316410 | 12/1998 |
| JP | 11-092135 A | 4/1999 |
| JP | 11-171517 A | 6/1999 |
| JP | 11-171518 A | 6/1999 |
| JP | 2000-154009 A | 6/2000 |
| JP | 2001-122603 | 5/2001 |
| JP | 2001-122605 A | 5/2001 |
| JP | 2001-122604 | 8/2001 |
| JP | 2002-519294 | 7/2002 |
| JP | 2005-507849 A | 3/2005 |
| JP | 2008-195548 | 8/2008 |
| WO | WO 99/40027 A1 | 8/1999 |

OTHER PUBLICATIONS

Li, Ling-yun et al., Progress in preparation techniques of LiPF6, Chemical Industry and Engineering, May 2005, vol. 22, No. 3, pp. 224-228 and lines 13-16 in left column on p. 225.

Office Action issued Jul. 19, 2013 in corresponding TW application No. 10220949220.

Extended Search Report in corresponding European Application No. 08792375.1 issued Sep. 28, 2012.

Office Action in corresponding Japanese Application No. 2008-009484 issued Oct. 23, 2012.

Chinese Office Action dated Jun. 21, 2011 in Application No. 200880102790.7.

International Search Report for International Application No. PCT/JP2008/064392 dated Aug. 25, 2008.

Lange, Willy, The Chemistry of Fluoro Acids, Fluorine Chemistry vol. 1, 1950, pp. 164-167.

Abstract Document No. XP-002669525, dated Feb. 3, 2012, Previous Publication No. JP 11171518A, Applicant: Central Glass Co., Ltd., Publication Date: Jun. 29, 1999, Database WPI, Week 199936, Thomson Scientific, London, GB, AN 1999-424692.

Abstract Document No. XP-002668869, dated Feb. 3, 2012, Previous Publication No. JP 1072901A, Applicant: Central Glass Co., Ltd., Publication Date: Mar. 17, 1989, Database WPI, Week 198917, Thomson Scientific, London, GB, AN 1989-126434.

Abstract Document No. XP-002668870, dated Feb. 3, 2012, Previous Publication No. JP 4265213, Applicant: Central Glass Co., Ltd., Publication Date: Sep. 21, 1992, Database WPI, Week 199244, Thomson Scientific, London, GB, AN 1992-362491.

Supplementary European Search Report for Application No. EP 08704434 completed on Feb. 24, 2012.

Supplementary European Search Report for Application No. EP 09804954 completed on Mar. 1, 2012.

Smagin, A.A. et al., Application of thermogravimetric studies for optimization of lithium hexafluorophosphate production, Journal of Power Sources, Mar. 3, 1997, pp. 326-327, vol. 68.

Office Action dated Dec. 31, 2011 in Chinese Application No. 20880004476.5.

Clifford, A. et al., The hydrogem fluoride solvent system—III, J. Inorg. Chem., 1957, pp. 76-78, Pergamon Press Ltd., London, UK.

Clifford, A. et al., The hydrogem fluoride solvent system—VI, J. Inorg. Chem., 1961, pp. 147-154., vol. 20., Pergamon Press Ltd., Northern Ireland.

Gross, P., et al., Heat of formation of phosphorus pentafluoride, 1966, pp. 2716-2718, Fulmber Research Institute, Ltd., UK.

Ruff, O., Fluorination of phosphorous pentachloride (PCl5) usign arsenic trifluoride, Die Chemie des Fluors, 1920, p. 29.

* cited by examiner (a)

BUBBLING (b)

HEATING (c)

PROCESSES FOR PRODUCING PHOSPHORUS PENTAFLUORIDE AND PHOSPHATE HEXAFLUORIDE

This application is the U.S. National Phase under 35. U.S.C. §371 of International Application PCT/JP2008/064392, filed Aug. 11, 2008, which claims priority to Japanese Patent Application No. 2007-212277 and 2008-009484, filed Aug. 16, 2007 and Jan. 18, 2008 respectively. The International Application was published under PCT Article 21(2) in a language other than English.

TECHNICAL FIELD

The present invention relates to processes for producing phosphorus pentafluoride and a phosphate hexafluoride, and more specifically to a process for producing phosphorus pentafluoride, which is used as a raw material of a phosphate hexafluoride, and a process for producing a phosphate hexafluoride, which is useful as an electrolyte for a battery or cell, a catalyst for organic synthesis reaction, or the like.

BACKGROUND ART

As a conventional process for producing a phosphate hexafluoride, for example, a process for producing $LiPF_6$ may be a process of dissolving lithium chloride in hydrogen fluoride and then adding, thereto, phosphorus pentachloride (Non-Patent Document 1 described below). In this process, phosphorus pentachloride is added directly to hydrogen fluoride. Since phosphorus pentachloride has strong hygroscopic property, phosphorus pentachloride contains water contained originally therein and water absorbed from air at the time of the addition. $LiPF_6$ contains the waters, thereby being hydrolyzed. Thus, a lithium oxyfluoride such as $LiPOF_4$ is generated.

In order to solve such a problem, for example, Patent Document 1 described below discloses a method of cooling a gas generated by reaction between phosphorus pentachloride and hydrogen fluoride into the range from −40 to −84° C. to remove phosphorus oxyfluoride, and then introducing the gas into hydrogen fluoride in which lithium fluoride is dissolved.

Patent Document 2 described below discloses a process of allowing a phosphorus compound and hydrofluoric acid to react with each other to produce phosphorus pentafluoride, and introducing the phosphorus pentafluoride into a solution of a fluorine compound in anhydrous hydrofluoric acid, thereby producing a phosphate hexafluoride compound. Furthermore, Patent Document 2 states that as the phosphorus compound, $PCl_5$, $PBr_5$, $P_2S_5$, or the like is used without using any oxide or oxychloride of phosphorus, which gives water as a byproduct.

As described above, in conventional processes for producing $LiPF_6$, in the course of the production, water is involved; therefore, there is caused a problem that a hydrolyzate produced on the basis of the water results in the decrease of purity.

[Patent Document 1] JP-A-60-251109
[Patent Document 2] Japanese Patent No. 2987713
[Non-Patent Document 1] Fluorine Chemistry Vol. 1

DISCLOSURE OF THE INVENTION

Problems to be Solved by the Invention

In light of the problems, the invention has been made. An object thereof is to provide a phosphorus pentafluoride producing process wherein phosphorus pentafluoride is separated/extracted from a pentavalent phosphorus compound or a solution thereof, or a composition obtained by allowing the pentavalent phosphorus compound or the solution thereof to react with hydrogen fluoride, thereby producing phosphorus pentafluoride; and a phosphate hexafluoride producing process wherein the resultant phosphorus pentafluoride is used as raw material to produce a phosphate hexafluoride high in purity.

Means for Solving the Problems

In order to solve the conventional problems, the inventors have investigated processes for producing phosphorus pentafluoride and a phosphate hexafluoride. As a result, the inventors have found out that the object can be attained by adopting the following means, and have made the invention.

That is, in order to achieve the above described object, the present invention relates to a process for producing phosphorus pentafluoride, wherein a carrier gas is brought into contact with either of the following one: a pentavalent phosphorus compound, a solution thereof, or a solution in which a composition obtained by allowing the pentavalent phosphorus compound or the solution thereof to react with hydrogen fluoride is dissolved, thereby a phosphorus pentafluoride is extracted into the career gas.

In the process, a carrier gas is brought into contact with a pentavalent phosphorus compound or a solution thereof, or a solution in which a composition obtained by allowing a pentavalent phosphorus compound or a solution thereof to react with hydrogen fluoride is dissolved, thereby making it possible to separate phosphorus pentafluoride from the pentavalent phosphorus compound or the like and extract the phosphorus pentafluoride into the carrier gas. The phosphorus pentafluoride contains no water, so as to be high in purity. For this reason, the phosphorus pentafluoride is very good as a raw material of a phosphate hexafluoride.

In the invention of the above constitution, it is preferable that the solution, in which the composition is dissolved, is heated, thereby evaporating phosphorus pentafluoride gas together with hydrogen fluoride gas to separate phosphorus pentafluoride. At this time, when the content of hydrogen fluoride in the solution is small, it is allowable to dissolve hydrogen fluoride gas as the carrier gas, and subsequently heat the solution.

In order to achieve the above described object, the present invention relates a process for producing a phosphate hexafluoride, wherein phosphorus pentafluoride obtained by the process for producing phosphorus pentafluoride according to claim 1 is allowed to react with a fluoride in accordance with the following chemical reaction formula, thereby producing the phosphate hexafluoride:

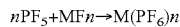
$n PF_5 + MFn \rightarrow M(PF_6)n$ wherein M represents any one selected from the group consisting of Li, Na, K, Rb, Cs, $NH_4$ and Ag when n is 1, represents any one selected from the group consisting of Ca, Mg, Ba, Zn, Cu and Pb when n is 2, and represents any one selected from the group consisting of Al and Fe when n is 3.

The phosphorus pentafluoride obtained by the producing process less contains water and has higher purity as compared with phosphorus pentafluoride obtained by conventional producing processes. Thus, the generation of a hydrolyzate of a phosphate hexafluoride can be depressed. In short, according to the process, a phosphate hexafluoride which does not contain a hydrolyzate and has high purity can be produced.

It is preferable that the reaction between the phosphorus pentafluoride and the fluoride, at least the following steps are conducted a first step of dissolving phosphorus pentafluoride gas in an organic solvent, a second step of adding, to the organic solvent, the fluoride, the amount of which is an amount stoichiometrically equivalent to the phosphorus pentafluoride, or a stoichiometric amount less than the stoichiometrically equivalent amount, thereby generating a solution of the phosphate hexafluoride, and a third step of cycling the solution of the phosphate hexafluoride into the first step, thereby dissolving phosphorus pentafluoride gas in the solution of the phosphate hexafluoride instead of the organic solvent.

In general, a fluoride is slightly soluble in any organic solvent. Accordingly, when a fluoride is added to an organic solvent before the absorption of phosphorus pentafluoride gas, the fluoride turns into a slurry state. For this reason, at the time of the absorption of phosphorus pentafluoride, the inside of the apparatus is blocked with the fluoride in a solid state so that the apparatus is hindered from being operated. However, according to the above-mentioned process, in the first step, phosphorus pentafluoride gas is first absorbed into an organic solvent, and subsequently a fluoride is added to the organic solvent in the second step. In this way, a phosphate hexafluoride is synthesized in the organic solvent as shown in the above-mentioned chemical reaction formula. Furthermore, the addition amount of the fluoride is a stoichiometrically equivalent to phosphorus pentafluoride or less than the stoichiometrically equivalent amount; therefore, the whole of the fluoride reacts with phosphorus pentafluoride. As a result, a non-slurry-state solution of a phosphate hexafluoride is obtained wherein an unreacted fluoride does not remain. This makes it possible to circulate the solution of the phosphate hexafluoride into the first step, and dissolve phosphorus pentafluoride gas in the solution of the phosphate hexafluoride instead of the organic solvent (the third step). In short, according to the above-mentioned process, various apparatuses including an absorption tower become usable, and further a continuous operation of a used apparatus becomes attainable. Thus, the productivity of the phosphate hexafluoride can be improved.

It is preferable that the organic solvent is at least either one of a nonaqueous organic solvent or a nonaqueous ionic liquid. This makes it possible to absorb phosphorus pentafluoride without inducing any hydrolysis. When phosphorus pentafluoride or a phosphate hexafluoride is hydrolyzed, produced are acidic materials, such as phosphate oxyfluoride, hydrogen fluoride, and phosphoric acid, or components insoluble in the organic solvent, such as a phosphates oxyfluoride and a phosphate. When an electrolytic solution containing these acidic materials or insoluble components is used in an electricity accumulating element, bad effects, such as corrosion, and a deterioration in electric properties, are given to the electricity accumulating element. It is therefore preferred to use, as the organic solvent, a solvent wherein the concentration of water is low. From such a viewpoint, the concentration of water in the organic solvent is preferably 100 ppm or less by weight, more preferably 10 ppm or less by weight, and in particular preferably 1 ppm or less by weight.

It is preferable that the first and third steps are conducted, using an absorption tower. According to the producing process of the invention, phosphorus pentafluoride is dissolved in an organic solvent and a phosphate hexafluoride solution and subsequently a fluoride is added thereto; therefore, the system does not turn into a slurry state. Therefore, even if, for example, an absorption tower is used in the first and third steps, the inside thereof is prevented from being blocked and a continuous operation thereof is made attainable. As a result, the productivity of the phosphate hexafluoride can be improved.

In order to achieve the above described object, the present invention relates an electrolytic solution, comprising a phosphate hexafluoride obtained by the process for producing the phosphate hexafluoride.

In order to achieve the above described object, the present invention relates an electricity accumulating element, comprising the electrolytic solution. Examples of the electricity accumulating element of the invention include a lithium-ion secondary battery and the like.

Effect of the Invention

The invention produces the following advantageous effects through the above-mentioned means.

According to the invention, a carrier gas is brought into contact with a pentavalent phosphorus compound or a solution thereof, or a solution in which a composition obtained by allowing a pentavalent phosphorus compound or a solution thereof to react with hydrogen fluoride is dissolved; therefore, phosphorus pentafluoride containing no water and having high purity can be produced. Furthermore, the phosphorus pentafluoride obtained by the invention is used as a raw material to produce a phosphate hexafluoride, thereby making it possible to render the produced phosphate hexafluoride one that contains no hydrolyzate and has high purity.

Figure 1:
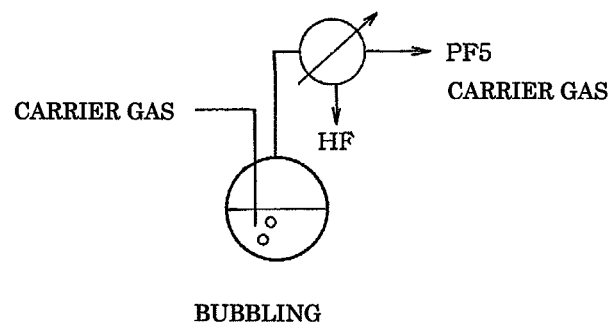
FIGS. 1(a) to 1(c) are explanatory views, each of which schematically illustrates a process for producing phosphorus pentafluoride according to an embodiment of the invention.
Figure 1:
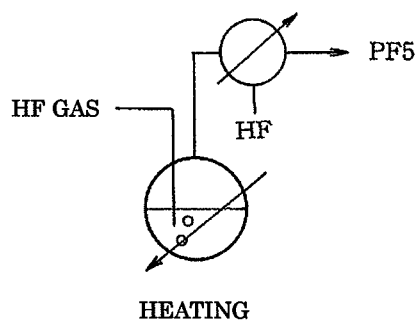
Figure 1:
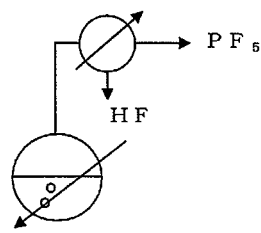

EXPLANATION OF REFERENCE NUMERALS 1 first absorption tower
2 first tank
3 pump
4 cooler
5 second absorption tower
6 second tank
7 pump
8 cooler
9 degassing tower
10 third tank
12 air pump
13 condenser
21 positive electrode
22 negative electrode
23 porous separator
24 positive electrode can
25 negative electrode can
26 gasket
27 spacer
28 spring

BEST MODE FOR CARRYING OUT THE INVENTION

With reference to FIG. 1, an embodiment of the invention will be described hereinafter. FIGS. 1(a) to 1(c) are explanatory views, each of which schematically illustrates an apparatus for producing phosphorus pentafluoride according to the embodiment. However, portions unnecessary for the description are omitted, and some portions thereof are illustrated with enlargement, reduction, or the like in order to make the description easy.

The phosphorus pentafluoride producing process according to the invention is conducted by bringing a carrier gas into contact with a pentavalent phosphorus compound or a solution thereof, or a solution in which a composition obtained by allowing the pentavalent phosphorus compound or the solution thereof to react with hydrogen fluoride is dissolved.

The pentavalent phosphorus compound may be in the state of any one of liquid, gas and solid. The compound may be dissolved in water or an organic solvent to be used in the form of a solution. The pentavalent phosphorus compound is not particularly limited, and examples thereof include phosphorus pentaoxide ($P_2O_5$), orthophosphoric acid ($H_3PO_4$), polyphosphoric acid, metaphosphoric acid, pyrophosphoric acid, triphosphoric acid, isodiphosphate, phosphonic acid, phosphinic acid, phosphenic acid, diphosphonic acid, cyanophosphoric acid, cyanophosphonic acid, diethyldithiophosphinic acid, chlorophenylphosphonic acid, trimethyl phosphate, o-methyl phenylselenophosphinate, pyrophosphonic acid, a phosphorus oxyhalide such as phosphorus oxychloride ($POCl_3$), phosphorus oxybromide ($POBr_3$), phosphorus oxyiodide ($POI_3$) or phosphorus oxyfluoride ($POF_3$), phosphorus pentasulfide ($P_2S_5$), phosphorus thiofluoride ($PSF_3$), trichlorophosphinesulfide ($PSCl_3$), phosphonitrile fluoride ($PNF_2$), phosphonitrile chloride ($PNCl_2$), phosphorus pentachloride, phosphorus pentabromide, phosphorus pentaiodide and the like. These phosphorus compounds may be used alone or in combination of two or more thereof.

The pentavalent phosphorus compound may be a compound obtained by oxidizing a zerovalent or trivalent phosphorus compound in a usual way. Examples of the zerovalent phosphorus compound include white phosphorus, red phosphorus, black phosphorus and the like. Examples of the trivalent phosphorus compound include phosphorus trichloride ($PCl_3$), phosphorus tribromide ($PBr_3$), phosphine ($PH_3$), phosphorous acid and the like.

As hydrogen fluoride described above, anhydrous hydrogen fluoride may be used as it is, or may be dissolved in water, an organic solvent, or a mixed solvent of water and an organic solvent to be used in the form of a hydrogen fluoride solution. The hydrogen fluoride solution is not particularly limited; for example, commercially available hydrofluoric acid in an industrial grade, a common grade, a semiconductor grade or the like may be used as it is, or may be used in a state where the concentration thereof is appropriately adjusted. Among them, from the viewpoint of less amount of impurities, the use of the semiconductor grade acid is preferred. From the viewpoint of costs, anhydrous hydrofluoric acid, the industrial grade acid or the common grade acid is preferred. For the impurity concentrations, the concentration of each metal impurity is preferably 1000 ppm or less by weight.

When the pentavalent phosphorus compound is used in the form of a solution, the concentration thereof is preferably from 1 to 100% by weight. If the concentration is less than 1% by weight, a decrease in the yield may be caused.

The concentration of hydrogen fluoride in the hydrogen fluoride solution is preferably in a range from 1 to 100% by weight. If the concentration is less than 1% by weight, the amount of impurities in the composition obtained is large. Thus, a decrease in the productivity may be caused.

It is sufficient that the proportion of hydrogen fluoride added to the pentavalent phosphorus compound is the chemical equivalent or more. If the addition proportion is a chemical equivalent or less, a decrease in the yield of phosphorus pentafluoride is caused. On the other hand, if the addition proportion is too large, an unfavorable result is caused from an industrial viewpoint.

The method for allowing the pentavalent phosphorus compound and hydrogen fluoride to react with each other is, for example, a method of adding both of a solution of the pentavalent phosphorus compound and a hydrogen fluoride solution at the same time, or a method of adding the both dropwise at the same time. The method may be a method of putting, into a reaction container, either one of a solution of the pentavalent phosphorus compound or a hydrogen fluoride solution in advance, and then adding the other dropwise thereto.

The temperature for the reaction between the pentavalent phosphorus compound and hydrogen fluoride is not particularly limited, and is preferably from −50 to 200° C. If the reaction temperature is lower than −50° C., the composition may aggregate or the reaction may not easily advance. On the other hand, if the reaction temperature is higher than 200° C., an especial apparatus is required so that an inconvenience may be caused.

The composition obtained by the reaction between the pentavalent phosphorus compound and hydrogen fluoride is represented by, for example, the following chemical formula: $H_xPO_yF_z \cdot nH_2O$ wherein $1 \leq x \leq 3$, $0 \leq y \leq 4$, $0 \leq z \leq 6$ and n is any positive number. More specifically, the composition is a composition containing at least one selected from the group of compounds represented by $HPF_6 \cdot nH_2O$, $HPOF_4 \cdot nH_2O$, $HPO_2F_2 \cdot nH_2O$, $H_2PO_3F \cdot nH_2O$, and $H_3PO_4 \cdot nH_2O$. The composition may also include a compound represented by a chemical formula $POqFr$ wherein $0 \leq q \leq 2$, $1 \leq r \leq 5$ and n is any positive number. More specific examples thereof include $PF_5 \cdot nH_2O$, $POF_3 \cdot nH_2O$, $PO_2F \cdot nH_2O$ and the like.

The solution obtained by the reaction between the pentavalent phosphorus compound and hydrogen fluoride is not particularly limited. The content of oxygen atoms in the composition is preferably 50% or less by weight, more preferably 30% or less by weight, and in particular preferably 20% or less by weight. If the content of the oxygen atoms is more than 50% by weight, a waste liquid obtained after phosphorus pentafluoride is extracted with the carrier gas may become large.

The content of phosphorus atoms in the solution is not particularly limited, and is preferably 0.01% or more by weight and 25% or less by weight, more preferably 0.01% or more by weight and 15% or less by weight, and in particular preferably 0.1% or more by weight and 10% or less by weight. If the content of the phosphorus atoms is less than 0.01% by weight, the yield of phosphorus pentafluoride may decline. On the other hand, if the content of the phosphorus atoms is more than 25% by weight, the viscosity of the solution obtained by the reaction between the pentavalent phosphorus compound and hydrogen fluoride becomes high so that an inconvenience may be caused when the solution is transported. Alternatively, gas is generated so that an inconvenience may be caused.

The carrier gas is preferably a gas inert to the solution in which the composition is dissolved. Specific examples thereof include HF gas, $N_2$ gas, He gas, Ar gas, dry air, carbon dioxide gas and the like. Of these gases, HF gas is preferred in the invention. Into HF gas may be incorporated one or more of the other gases, which have been described above.

For the carrier gas, the water content is 1% or less by weight, more preferably 100 ppm or less by weight, and in particular preferably 10 ppm or less by weight. If the water content is more than 1% by weight, the water content in phosphorus pentafluoride extracted also increases. When the phosphorus pentafluoride is used as a raw material of a phosphate hexafluoride, the contained water unfavorably causes the generation of a hydrolyzate of the phosphate hexafluoride.

The means for bringing the carrier gas into contact with the solution in which the composition is dissolved is not particularly limited, and is preferably an ordinarily used gas-liquid contactor in a tank or tower form. As illustrated in, for example, FIG. 1(a), the contact is attained by bubbling the solution in which the composition is dissolved with the carrier gas. Phosphorus pentafluoride extracted together with the carrier gas hardly contains water therein. Thus, obtained is a material suitable as a raw material of a phosphate hexafluoride.

When HF gas is used as the carrier gas, as illustrated in FIG. 1(b), it is allowable to dissolve HF gas beforehand in the solution in which the composition is dissolved, and heat this solution to be distilled. In this case, together with the evaporation of HF gas, phosphorus pentafluoride can be extracted and separated.

As illustrated in FIG. 1(c), in a case where a large amount of hydrogen fluoride is contained in the composition, phosphorus pentafluoride can be extracted and separated into the generated HF gas by heating the solution in which the composition is dissolved. A case, where a large amount of hydrogen fluoride is contained in the composition, means that the mole number of hydrogen fluoride in the composition is in the range of 10 times or more and 5000 times or less, preferably in the range of 50 times or more and 500 times or less that of phosphorus atoms in the composition.

For the amount of the carrier gas used, the mole number thereof is preferably in the range of 10 times or more and 5000 times or less, more preferably in the range of 50 times or more and 500 times or less that of the phosphorus atoms in the solution. If the amount used is more than the upper limit, energy costs unfavorably increase although the efficiency of extracting phosphorus pentafluoride rises. On the other hand, if the amount used is less than the lower limit, the amount of phosphorus pentafluoride extracted lowers so that phosphorus is unfavorably discharged to the outside of the reaction system.

The temperature when the carrier gas is brought into contact with the solution is preferably from −50 to 100° C., more preferably from −10 to 50° C., and in particular preferably from 0 to 30° C. If the temperature is lower than −50° C., the vapor pressure of phosphorus pentafluoride lowers to cause an inconvenience that the extracting efficiency deteriorates. On the other hand, if the temperature is higher than 100° C., water is put into the system to cause an inconvenience that phosphorus pentafluoride is hydrolyzed. In the case of the distillation-based methods illustrated in FIGS. 1(b) and 1(c), the heating temperature needs to be equal or higher than the boiling point of hydrogen fluoride. More specifically, when any one of the methods is performed at, e.g., 1 atm., the temperature is preferably in the range from 19.5 to 50° C., more preferably in the range from 20 to 30° C.

The pressure when the carrier gas is brought into contact with the solution is preferably from 1 KPa to 5 MPa, more preferably from 10 KPa to 1 MPa, and in particular preferably from 0.05 MPa to 0.5 MPa. If the pressure is less than 1 KPa, a long and large vacuum facility is required to cause an inconvenience that costs increase excessively. On the other hand, if the pressure is more than 5 MPa, there is caused an inconvenience that the apparatus for the high pressure becomes too large.

In the phosphorus pentafluoride producing process according to the invention, a carrier gas may be directly brought into contact with a pentavalent phosphorus compound or a solution thereof, or a solution of the pentavalent phosphorus compound, thereby producing phosphorus pentafluoride. In this case, as the carrier gas, for example, HF gas is preferably used. When HF gas contacts a pentavalent phosphorus compound or a solution thereof, or a solution of the pentavalent phosphorus compound, a reaction is generated between the both so that the above-mentioned composition is obtained. Furthermore, HF gas makes it possible to separate and extract phosphorus pentafluoride containing no water from the composition.

When phosphorus oxyfluoride, such as $POF_3$, beside phosphorus pentafluoride is also extracted in the carrier gas, it is preferred to allow the carrier gas to contact with anhydrous hydrogen fluoride. It is more preferred to allow the gas to contact with anhydrous hydrogen fluoride in a liquid form at this time. This manner makes it possible to allow the phosphorus oxyfluoride, such as $POF_3$, and anhydrous hydrogen fluoride to react with each other as shown in the following chemical reaction formula, thereby producing $PF_5$.

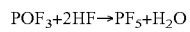

$$POF_3 + 2HF \rightarrow PF_5 + H_2O$$

It is preferred to reuse the carrier gas, which is used to produce phosphorus pentafluoride. When, for example, HF gas is used as the carrier gas, HF gas containing phosphorus pentafluoride is condensed to separate phosphorus pentafluoride and HF from each other. It is allowable to heat and evaporate condensed and collected HF, and reuse the HF as the carrier gas, or use the HF for the reaction with the pentavalent phosphorus compound. The temperature when the HF gas is condensed is preferably from −80 to 100° C., more preferably from −50 to 50° C., and in particular preferably from −10 to 20° C.

For the solution from which phosphorus pentafluoride has been separated, it is preferred to separate and collect HF and a phosphorus component from this solution. The collected phosphorus component is concentrated, and then reused as the pentavalent phosphorus compound, which is a raw material. The operation for the separation may be, for example, a method conventionally known, such as distillation. The collected hydrogen fluoride may be reused for reaction with the phosphorus compound, and may be used as it is as hydrofluoric acid for industry, or used in a state where the concentration thereof is appropriately adjusted. When the amount thereof is very small, the hydrogen fluoride may be subjected to direct waste liquid treatment to be discharged.

Next, $PF_5$ gas separated from the carrier gas is brought into contact with a fluoride (MFn), thereby producing a phosphate hexafluoride as represented by a chemical reaction formula illustrated below. Phosphorus pentafluoride obtained in the present report may be allowed to be absorbed into an organic solvent, thereby yielding a high-purity $PF_5$ complex. The organic solvent is not particularly limited, and examples thereof include methanol, tetrahydrofuran, diethyl ether, tetrahydrothiophene, triethylamine, propylene carbonate, dimethyl carbonate, diethyl carbonate and the like. Furthermore, to the $PF_5$ complex may be added hydrogen fluoride in a chemical equivalent amount to yield a phosphate hexafluoride solution containing no water.

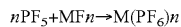

$$nPF_5 + MFn \rightarrow M(PF_6)n$$

wherein M represents any one selected from the group consisting of Li, Na, K, Rb, Cs, $NH_4$ and Ag when n is 1, represents any one selected from the group consisting of Ca, Mg, Ba, Zn, Cu and Pb when n is 2, and represents any one selected from the group consisting of Al and Fe when n is 3.

Specific examples of the method for producing a phosphate hexafluoride include (1) a method of allowing a solid fluoride to react with $PF_5$ gas, (2) a method of allowing a fluoride dissolved in anhydrous hydrogen fluoride that is a solvent to react with $PF_5$ gas, (3) a method of allowing a fluoride and $PF_5$ gas to react with each other in an organic solvent, and the like.

Figure 2:
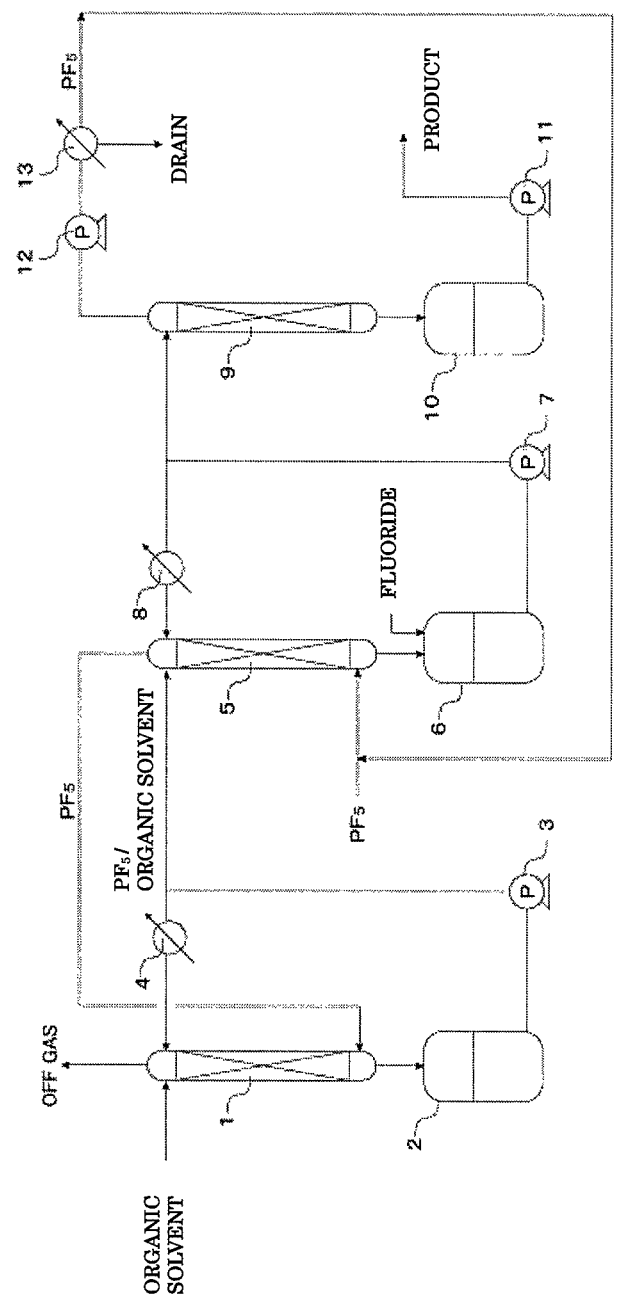
FIG. 2 is an explanatory view which schematically illustrates an apparatus for producing a phosphate hexafluoride according to an embodiment of the invention.

The method of allowing a fluoride and $PF_5$ gas to react with each other in an organic solvent is preferably a method of dissolving $PF_5$ gas first in the organic solvent, and then adding the fluoride to the organic solvent, thereby allowing the fluoride and $PF_5$ gas to react with each other in the organic solvent. A producing apparatus used in this method is illustrated in FIG. 2. The producing apparatus illustrated in the figure is equipped with a first absorption tower 1 and a second absorption tower 5; a first tank 2, a second tank 6 and a third tank 10; pumps 3, 7 and 11; a first cooler 4 and a second cooler 8; a degassing tower 9; an air pump 12; and a condenser 13.

A predetermined amount of an organic solvent is charged into each of the first tank 2 and the second tank 6. The liquid in the first tank 2 and that in the second tank 6 are supplied into the first absorption tower 1 and the second absorption tower 5, respectively, through the pumps 3 and 7 to make a circulating operation. Next, phosphorus pentafluoride ($PF_5$) gas is supplied into a tower bottom section of the second absorption tower 5. The phosphorus pentafluoride may be 100%-purity phosphorus pentafluoride, or a material diluted appropriately by mixing an inert gas therewith. The mixing of the inert gas makes it possible to relieve heat-generation in the first absorption tower 1 and the second absorption tower 5. The inert gas is not particularly limited, and examples thereof include $N_2$, Ar, dry air, carbon dioxide gas and the like. The amount of water in the inert gas used for the dilution is preferably as low as 100 ppm or less by weight, more preferably 10 ppm or less by weight, and in particular preferably 1 ppm or less by weight so as not to induce the hydrolysis of the phosphorus pentafluoride. The phosphorus pentafluoride gas is brought into countercurrent contact with the organic solvent in the second absorption tower 5 to be dissolved in the organic solvent (first step). Heat of the absorption of the phosphorus pentafluoride in the organic solvent is removed by the first and second coolers 4 and 8 located in the circulating line to keep the apparatus at an appropriate operating temperature.

Next, the organic solvent in which the phosphorus pentafluoride gas is dissolved is supplied to the second tank 6. Into the second tank 6 is supplied a fluoride, the amount of which is an amount stoichiometrically equivalent to the phosphorus pentafluoride, or a stoichiometric amount less than the stoichiometrically equivalent amount. In this way, the phosphorus pentafluoride and the fluoride react with each other to produce a phosphate hexafluoride (second step). The following reaction formula represents a reaction between phosphorus pentafluoride and lithium fluoride:

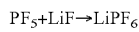

The phosphate hexafluoride solution produced in the second tower 6 is sent out through a pipe by the pump 7 to be supplied to a tower top section of the second absorption tower 5. The phosphorus pentafluoride supplied into the tower bottom section is absorbed into the phosphate hexafluoride solution inside the second absorption tower (third step). Subsequently, in the second tank 6, the reaction with the fluoride is continuously conducted, thereby heightening the concentration of the phosphate hexafluoride up to a desired value. By making this circulating operation, a portion of the solution from the pump 7 is taken out as a product when the concentration of the phosphate hexafluoride reaches the predetermined concentration. At the same time when the product is taken out, the organic solvent starts to be supplied from the outside to the first absorption tower 1 and further the destination of the solution supply from the pump 3 is switched from the first absorption tower 1 to the second absorption tower 5 to produce a solution of the phosphate hexafluoride continuously. In this case, it is allowable that a portion of the absorbing liquid is subsequently circulated into the first absorption tower 1 and simultaneously the absorbing liquid is supplied into the second absorption tower 5.

The amount of the supply of the fluoride into the second tank 6 is preferably an amount stoichiometrically equivalent to the phosphorus pentafluoride dissolved in the organic solvent or a stoichiometric amount less than the stoichiometrically equivalent amount in order that the fluoride, which is slightly soluble in the organic solvent, can avoid being present in a slurry form. This makes it possible to avoid a matter that the inside of the apparatus is blocked with any slurry-form fluoride. A method for making the amount of the phosphorus pentafluoride stoichiometrically excessive over the amount of the fluoride can be realized by supplying the fluoride continuously with the phosphorus pentafluoride stoichiometrically excessive, at any time, over the fluoride. However, it is indispensable that the excessive amount of the phosphorus pentafluoride is discharged from the system to the outside at anyone of the steps; thus, a loss of the raw material is unfavorably generated. More preferred is a method of supplying the phosphorus pentafluoride and the fluoride in amounts stoichiometrically equivalent to each other to a solution into which the phosphorus pentafluoride in an excessive amount and suitable for the operation is allowed to be absorbed in advance.

The phosphate hexafluoride solution produced in the second step, in which the phosphorus pentafluoride is excessively dissolved, is supplied to the tower top section of the second absorption tower 5 in the third step. However, a portion thereof is also supplied to the degassing tower 9. Furthermore, the phosphate hexafluoride solution sent into the degassing tower 9 is subjected to a pressure reduction through the air pump 12, whereby the phosphorus pentafluoride gas is distilled off. According to this manner, the solution is prepared into a solution in which the phosphorus pentafluoride and the fluoride are stoichiometrically equivalent to each other. The solution is taken out as a product from the third tank 10. The phosphate hexafluoride solution may be prepared by adding the fluoride stoichiometrically equivalent to the excessively dissolved phosphorus pentafluoride. However, it is preferred from the viewpoint of continuous productivity that the excessive phosphorus pentafluoride is distilled off under a reduced pressure. In order to raise the efficiency of removing the phosphorus pentafluoride under the reduced pressure, the degassing tower 9 may be equipped with a heater to perform heating.

The distilled-off phosphorus pentafluoride gas is supplied to the tower bottom section of the second absorption tower 5 by the air pump 12. Furthermore, in the second absorption tower 5, the gas is brought into countercurrent contact with the organic solvent and/or the phosphate hexafluoride solution to be collected and reused. When the phosphorus pentafluoride, which is used as raw material, contains a small amount of hydrogen fluoride, it is allowable to subject the phosphate hexafluoride solution to a pressure reduction through the air pump 12 to distill off hydrogen fluoride, and then condense the hydrogen fluoride in the condenser 13 to be removed. The liquid (drain) condensed in the condenser 13 contains the organic solvent, the hydrogen fluoride, and the phosphorus pentafluoride; while this state of the drain is kept as it is, the drain may be subjected to waste liquid treatment, and then discharged. Alternatively, the hydrogen fluoride, the phosphorus pentafluoride or the organic solvent may be collected and reused if necessary. A method for the collection may be an ordinary method such as distillation or extraction.

As described above, by circulating a solution of phosphorus pentafluoride in the invention, a high-purity phosphate hexafluoride can be continuously produced with a good yield.

In the invention, it is preferred from the viewpoint of industrial production efficiency to use absorption towers. However, the adoption of a method based on surface absorption or bubbling is not excluded. For each of the first and second absorption towers 1 and 5, an absorbing apparatus in any tower form, such as a packed tower, a plate tower, or a wetted-wall tower, may also be used. Furthermore, the form of the absorption may be either of a countercurrent or concurrent form.

In the first and third steps, the concentration of the phosphorus pentafluoride gas in the organic solvent and the phosphate hexafluoride is preferably 15% or less by weight, more preferably 10% or less by weight, and in particular preferably 5% or less by weight. If the concentration of the phosphorus pentafluoride gas in the organic solvent is more than 15% by weight, the organic solvent and the phosphorus pentafluoride react with each other so that the organic solvent may be colored, denatured or solidified. Additionally, absorption heat becomes large so that the control of the liquid temperature may become difficult.

In the first and third steps, the temperature for the gas-liquid contact of the phosphorus pentafluoride gas with the organic solvent and the phosphate hexafluoride solution is preferably from −40 to 100° C., more preferably from 0 to 60° C. If the gas-liquid contact temperature is lower than −40° C., the organic solvent is solidified so that the operation becomes unable to be continuously made. On the other hand, if the gas-liquid contact temperature is higher than 100° C., the vapor pressure of the phosphorus pentafluoride in the organic solvent and the phosphate hexafluoride becomes too high to cause an inconvenience that the absorption efficiency lowers or the organic solvent and the phosphorus pentafluoride react with each other.

The organic solvent is preferably at least either one of a nonaqueous organic solvent or a nonaqueous ionic liquid. The nonaqueous organic solvent is more preferably a nonaqueous aprotic organic solvent. Since the aprotic solvent has no capability of donating a hydrogen ion, the phosphate hexafluoride solution obtained by the producing process of the invention can be used, as it is, as an electrolytic solution of an electricity accumulating element such as a lithium-ion secondary batter.

The nonaqueous organic solvent is not particularly limited, and examples thereof include ethylene carbonate, propylene carbonate, butylene carbonate, vinylene carbonate, dimethyl carbonate, diethyl carbonate, methyl ethyl carbonate, methyl acetate, ethyl acetate, γ-butyrolactone, acetonitrile, dimethylformamide, 1,2-dimethoxyethane, methanol, isopropanol and the like. Of these organic solvents, the following are preferred from the viewpoint of continuous production: ethylene carbonate, propylene carbonate, dimethyl carbonate, diethyl carbonate, methyl ethyl carbonate, acetonitrile, and 1,2-dimethoxyethane, each of which is a solvent from which the produced phosphate hexafluoride is not easily precipitated, that is, each of which is high in the capability of dissolving the phosphate hexafluoride therein. These nonaqueous organic solvents may be used alone or in the form of a mixture of two or more thereof.

Examples of the nonaqueous aprotic organic solvent include cyclic carbonate, linear carbonate, carboxylic acid ester, nitrile, amide, ether compounds and the like. These nonaqueous aprotic organic solvents may be used alone or in the form of a mixture of two or more thereof.

The nonaqueous ionic liquid is not particularly limited, and examples thereof include fluoride complexes of a quaternary ammonium or quaternary phosphonium; and fluorides thereof. Examples of the quaternary ammonium cation include a tetraalkylammonium cation, an imidazolium cation, a pyrazolium cation, a pyridinium cation, a triazolium cation, a pyridazinium cation, a thiazolium cation, an oxazolium cation, a pyrimidinium cation, a pyrazinium cation and the like. Examples of the quaternary phosphonium cation include a tetraalkylphosphonium cation and the like. These nonaqueous ionic liquids may be used alone or in the form of a mixture of two or more, or may be used in the state of being dissolved in the nonaqueous organic solvent.

The organic solvent may be a nonaqueous organic solvent or a nonaqueous ionic liquid, or may be a mixture made of two or more out of the nonaqueous organic solvents and the nonaqueous ionic liquids.

The fluoride (MFn wherein M represents a metal or $NH_4$, and $1 \leq n \leq 3$) added in the second step is not limited to LiF, and examples thereof include NaF, KF, RbF, CsF, $NH_4F$, AgF, $CaF_2$, $MgF_2$, BaF, $ZnF_2$, $CuF_2$, $PbF_2$, $AlF_3$, $FeF_3$ and the like. These fluorides may be used alone or in the form of a mixture of two or more thereof.

The temperature for the reaction between a fluoride and $PF_5$ gas is preferably from −50 to 200° C., more preferably from −10 to 100° C., and in particular preferably from 0 to 50° C. If the temperature is lower than −50° C., the reaction may not easily advance. On the other hand, if the temperature is higher than 200° C., the produced phosphate hexafluoride may decompose. In the case of the method (2), it is preferred to make an operation for cooling or the like in order to restrain the reaction according to the above-mentioned chemical reaction formula, and then allow the fluoride and the gas to react with each other at a temperature not lower than the boiling point (in the case of using, e.g., anhydrous hydrogen fluoride as the solvent, the temperature is 19.5° C. or lower, preferably from 0 to 10° C. at 1 atmosphere).

From the viewpoint of improving the purity and the yield of the phosphate hexafluoride, it is preferred to allow the $PF_5$ gas to react with the fluoride under the condition that the amount of the gas is excessive over that of the fluoride. Specifically, for example, the weight of the gas is preferably from 1 to 10 times, more preferably from 1.01 to 5 times, and in particular preferably from 1.05 to 2 times that of the fluoride. If the amount of the $PF_5$ gas used is more than 10 times, an excessive portion of the $PF_5$ gas may flow to the outside of the reaction system to cause a decrease in the yield of phosphorus although the yield of the phosphate hexafluoride increases. On the other hand, if the amount used is less than the amount of the fluoride, the yield of the phosphate hexafluoride unfavorably lowers.

It is preferred to allow an excessive portion of the phosphorus-component-containing gas used to produce the phosphate hexafluoride, specifically the $PF_5$ gas, to be absorbed into an absorbing liquid, and then collect and reuse the gas portion. The absorbing liquid is, for example, a solution containing at least one selected from the group consisting of water, aqueous hydrofluoric acid solution, and an M salt wherein M represents at least one selected from the group consisting of Li, Na, K, Rb, Cs, $NH_4$, Ag, Mg, Ca, Ba, Fe and Al. More specifically, the absorbing liquid is water or aqueous hydrogen fluoride solution having a concentration of 0-80% by weight, or water or aqueous hydrogen fluoride solution having a concentration of 0 to 80% by weight in which an M salt (the M salt is a carbonate, hydroxide, or halide containing at least one selected from the group consisting of Li, Na, K, Rb, Cs, $NH_4$, Ag, Mg, Ca, Ba, Fe and Al) is dissolved. When the $PF_5$ gas is allowed to be absorbed into the absorbing liquid, the gas can be collected in the form of $M(PF_6)n$ wherein $1 \leq n \leq 3$ and/or $HaPObFc.mH_2O$ wherein $1 \leq a \leq 3$, $0 \leq b \leq 4$, $0 \leq c \leq 6$ and $0 \leq m \leq 8$. This makes it possible to restrain a raw material loss even when the $PF_5$ gas is used in an excessive amount.

As illustrated in FIG. 2, in the production of the phosphorus pentafluoride, the phosphorus pentafluoride which has flowed out from the second absorption tower 5 is collected in the first absorption tower 1 connected thereto in series. The organic solvent containing the phosphorus pentafluoride obtained in the first absorption tower 1 is supplied into the second absorption tower 5. The phosphorus pentafluoride portion that has not been absorbed in the first absorption tower 1 may be collected and reused by the above-mentioned absorbing method. This makes it possible that even when an excessive amount of the phosphorus pentafluoride gas is used, the total amount thereof is used to restrain a raw material loss.

The phosphorus-component-containing gas generated when the phosphorus pentafluoride is produced, specifically phosphorus pentafluoride gas and HF gas, may be introduced into a phosphorus pentafluoride extracting apparatus and reused therein as a carrier gas. This makes it possible that even when an excessive amount of the phosphorus pentafluoride gas is used, a raw material loss is depressed.

HF gas generated in the production of the phosphate hexafluoride may be used as the carrier gas. Alternatively, the HF gas may be condensed and collected or be allowed to be absorbed into water and collected in order to be used for the reaction with the phosphorus compound.

A reactor used in the invention is not particularly limited as far as the reactor is made of a material having resistance against the composition, and is preferably made of stainless steel or carbon steel. However, in a case where anhydrous hydrogen fluoride or a composition made of the above-mentioned composition leaks or is exposed to the air, or in some other case, it is feared that this corrodes the reactor. When the reactor is corroded, the resultant product is also contaminated with the corroded material. The contaminant causes an increase in the content of metal components in the product. For this reason, it is preferred to use, as the reactor, a reactor made of fluorine-contained resin, vinyl chloride or polyethylene, or a reactor lined therewith, which has resistance against the composition.

EXAMPLES

Preferred examples of this invention will be demonstratively described in detail hereinafter. However, for the materials, blend amounts thereof, and the like described in these examples and comparative examples, the scope of this invention is not limited thereto unless they are in particular restrictively described. Thus, the materials and the like are merely explanatory examples. All of the examples and the comparative examples were conducted under the atmospheric pressure.

Example 1

Into a 5-L reaction tank made of fluorine-contained resin were put 200 g of a commercially available 75% phosphoric acid solution in water and 2000 g of anhydrous hydrogen fluoride (HF) together with a rotator, and the reaction tank was connected to a reflux condenser (20 mm in diameter×2 m) made of stainless steel. The fluorine-contained resin reaction tank was heated to 45° C. in a water bath while the reflux condenser was cooled with brine of −30° C. Furthermore, a magnetic stirrer was used to stir the reaction liquid. When the bath temperature was raised, the reflux of HF was started. At this time, the temperature of the inside liquid was 22° C.

After 5 minutes, a gas was generated from the outlet in the reflux condenser. This gas was analyzed by FTIR. As a result, it was verified that the gas was made of $PF_5$ and a small amount of HF. In the generated gas, phosphorus oxyfluorides, such as $POF_3$, were not detected.

For the simultaneously generated gas, into a 1-L reaction tank made of fluorine-contained resin were put 5 g of separately prepared lithium fluoride (LiF) and 100 g of anhydrous HF together with a rotator to be dissolved, and the outlet in the reflux condenser was connected to the 1-L fluorine-contained resin reaction tank to make the generated gas capable of being absorbed into the 1-L fluorine-contained resin reaction tank. The 1-L fluorine-contained resin reaction tank was cooled in an ice bath. In each of the reaction tanks, stirring was conducted.

The outlet in the reflux condenser was connected to the 1-L fluorine-contained resin reaction tank, and the generated gas was allowed to be absorbed therein. As a result, the temperature of the 1-L fluorine-contained resin reaction tank rose from 0 to 5° C. After the generated gas was allowed to be absorbed therein, the 1-L fluorine-contained resin reaction tank was taken off from the outlet in the reflux condenser, and then cooled to −40° C. to crystallize for 12 hours. Next, a supernatant in the 1-L fluorine-contained resin reaction tank was slowly taken out to conduct solid-liquid separation. After the separation, $N_2$ was introduced into the reaction tank at 3 L/minute. Hydrogen fluoride adhering to the crystal was dried and removed. Subsequently, the resultant was further dried in a drying machine of 100° C. for 3 hours. As a result, 15 g of a white crystal was obtained.

The resultant white crystal was analyzed by XRD. As a result, it was identified as lithium phosphate hexafluoride ($LiPF_6$). The crystal was analyzed by ion chromatography. As a result, the amount of anions of phosphate oxyfluoride was 50 ppm or less by weight. The amount of water was 10 ppm or less by weight, and the concentration of free hydrofluoric acid was 50 ppm or less by weight. The water amount and the free hydrofluoric acid concentration were measured by the Karl Fisher method and neutralization titration with sodium hydroxide, respectively.

Example 2

Into a 5-L reaction tank made of fluorine-contained resin were put 200 g of a commercially available 75% phosphoric acid solution in water and 2000 g of anhydrous hydrogen fluoride (HF) together with a rotator, and the reaction tank was connected to a reflux condenser (20 mm in diameter×2 m) made of stainless steel. The fluorine-contained resin reaction tank was kept at a constant temperature of 20° C. in a water bath while the reflux condenser was cooled with brine of −30° C. A magnetic stirrer was used to stir the reaction liquid. Furthermore, the liquid in the fluorine-contained resin reaction tank was bubbled with nitrogen gas at 2 L/minute.

A gas generated from the outlet in the reflux condenser was analyzed by FTIR. As a result, it was verified that the gas was made of $PF_5$ and a small amount of HF. In the generated gas, phosphorus oxyfluorides, such as $POF_3$, were not detected.

Example 3

Into a 5-L reaction tank made of fluorine-contained resin was put 200 g of a commercially available 75% phosphoric acid solution in water together with a rotator, and the reaction tank was connected to a reflux condenser (20 mm in diameter×2 m) made of stainless steel. The fluorine-contained resin reaction tank was kept at a constant temperature of 20° C. in a water tank while the reflux condenser was cooled with brine of −30° C. A magnetic stirrer was used to stir the reaction liquid. Furthermore, anhydrous hydrogen fluoride in a gas form was introduced at 150 g/minute into the phosphoric acid solution in the fluorine-contained resin reaction tank.

A gas generated from the outlet in the reflux condenser was analyzed by FTIR. As a result, it was verified that the gas was made of $PF_5$ and a small amount of HF. In the generated gas, phosphorus oxyfluorides, such as $POF_3$, were not detected.

Example 4

Into a 5-L reaction tank made of fluorine-contained resin were put 200 g of commercially available anhydrous phosphoric acid and 1800 g of anhydrous hydrogen fluoride (HF) together with a rotator, and the reaction tank was connected to a reflux condenser (20 mm in diameter×2 m) made of stainless steel. The fluorine-contained resin reaction tank was heated to 45° C. in a water bath while the reflux condenser was cooled with brine of −30° C. Furthermore, a magnetic stirrer was used to stir the reaction liquid. As the bath temperature was raised, the reflux of HF was started. At this time, the temperature of the inside liquid was 22° C.

After 5 minutes, a gas was generated from the outlet in the reflux condenser. This gas was analyzed by FTIR. As a result, it was verified that the gas was made of $PF_5$ and a small amount of HF. In the generated gas, phosphorus oxyfluorides, such as $POF_3$, were not detected.

For the simultaneously generated gas, into a 1-L reaction tank made of fluorine-contained resin were put 5 g of separately prepared lithium fluoride (LiF) and 100 g of anhydrous HF together with a rotator to be dissolved, and the outlet in the reflux condenser was connected to the 1-L fluorine-contained resin reaction tank to make the generated gas capable of being absorbed into the 1-L fluorine-contained resin reaction tank. The 1-L fluorine-contained resin reaction tank was cooled in an ice bath. In each of the reaction tanks, stirring was conducted.

The outlet in the reflux condenser was connected to the 1-L fluorine-contained resin reaction tank to allow the generated gas to be absorbed therein. As a result, the temperature of the solution in the 1-L fluorine-contained resin reaction tank rose from 0 to 5° C. After the generated gas was allowed to be absorbed therein, the 1-L fluorine-contained resin reaction tank was taken off from the outlet in the reflux condenser, and then cooled to −40° C. to crystallize for 12 hours. Next, a supernatant in the 1-L fluorine-contained resin reaction tank was slowly taken out to conduct solid-liquid separation. After the separation, $N_2$ was introduced into the reaction tank at 3 L/minute. Hydrogen fluoride adhering to the crystal was dried and removed. Subsequently, the resultant was further dried in a drying machine of 100° C. for 3 hours. As a result, 15 g of a white crystal was obtained.

The resultant white crystal was analyzed by XRD. As a result, it was identified as lithium phosphate hexafluoride ($LiPF_6$). The crystal was analyzed by ion chromatography. As a result, the amount of anions of phosphate oxyfluoride was 50 ppm or less by weight. The amount of water was 10 ppm or less by weight, and the concentration of free hydrofluoric acid was 50 ppm or less by weight. The water amount and the free hydrofluoric acid concentration were measured by the Karl Fisher method and neutralization titration with sodium hydroxide, respectively.

Example 5

Into a 5-L reaction tank made of fluorine-contained resin was put 1500 g of a 90% by weight hydrogen fluoride solution in water. While the solution was stirred, 153 g of commercially available phosphorus oxytrichloride was dropwise added thereto. The mixing operation was made while the 5-L fluorine-contained resin reaction tank was cooled with ice. Thereafter, the reaction tank was connected to a reflux condenser (20 mm in diameter×2 m) made of stainless steel. The fluorine-contained resin reaction tank was heated to 45° C. in a water bath while the reflux condenser was cooled with brine of −30° C. Furthermore, a magnetic stirrer was used to stir the reaction liquid. As the bath temperature was raised, the reflux of HF was started. At this time, the temperature of the inside liquid was 30° C.

After 5 minutes, a gas was generated from the outlet in the reflux condenser. This gas was analyzed by FTIR. As a result, it was verified that the gas was made of $PF_5$, HCl and a small amount of HF. In the generated gas, phosphorus oxyfluorides, such as $POF_3$, were not detected.

For the simultaneously generated gas, into a 1-L reaction tank made of fluorine-contained resin were put 5 g of separately prepared lithium fluoride (LiF) and 100 g of anhydrous HF together with a rotator to be dissolved, and the outlet in the reflux condenser was connected to the 1-L fluorine-contained resin reaction tank to make the generated gas capable of being absorbed into the 1-L fluorine-contained resin reaction tank. The 1-L fluorine-contained resin reaction tank was cooled in an ice bath. In each of the reaction tanks, stirring was conducted.

The outlet in the reflux condenser was connected to the 1-L fluorine-contained resin reaction tank to allow the generated gas to be absorbed therein. As a result, the temperature of the solution in the 1-L fluorine-contained resin reaction tank rose from 0 to 5° C. After the generated gas was allowed to be absorbed therein, the 1-L fluorine-contained resin reaction tank was taken off from the outlet in the reflux condenser, and then cooled to −40° C. to crystallize for 12 hours. Next, a supernatant in the 1-L fluorine-contained resin reaction tank was slowly taken out to conduct solid-liquid separation. After the separation, $N_2$ was introduced into the reaction tank at 3 L/minute. Hydrogen fluoride adhering to the crystal was dried and removed. Subsequently, the resultant was further dried in a drying machine of 100° C. for 3 hours. As a result, 15 g of a white crystal was obtained.

The resultant white crystal was analyzed by XRD. As a result, it was identified as lithium phosphate hexafluoride ($LiPF_6$). The crystal was analyzed by ion chromatography. As a result, the amount of anions of phosphate oxyfluoride was 50 ppm or less by weight. The amount of water was 10 ppm or less by weight, and the concentration of free hydrofluoric acid was 50 ppm or less by weight. The water amount and the free hydrofluoric acid concentration were measured by the Karl Fisher method and neutralization titration with sodium hydroxide, respectively.

Example 6

Into a 5-L fluorine-contained resin container were put 200 g of a commercially available 75% phosphoric acid solution in water and 2000 g of anhydrous hydrogen fluoride (HF) together with a rotator. While the solution in the container was stirred, the solution was sampled to measure the concentration of phosphorus. As a result, it was 2.15%.

Next, the container was connected to a condenser made of stainless steel, the temperature of which was kept at −30° C. Anhydrous hydrogen fluoride gas of 21° C. was blown at 5 kg/hour into the solution in the container. In the stainless steel condenser, hydrogen fluoride blown as a carrier gas started to condense; thus, the hydrogen fluoride was taken out from the system, and heated to adjust the temperature thereof to 21° C. The hydrogen fluoride was circulated and used as the carrier gas. The amount of water in the circulated and used carrier gas was measured. As a result, it was 10 ppm or less by weight. The gas discharged from the outlet in the condenser was confirmed by FTIR. As a result, the gas was made of phosphorus pentafluoride and a small amount of HF. Phosphorus oxyfluorides, such as $POF_3$, were not detected.

After 5 hours, the blowing of the carrier gas was stopped, and the solution in the container was sampled to measure the concentration of phosphorus. As a result, it was 6500 ppm. Thereafter, the same operation was again made to start blowing hydrogen fluoride hereinto. After 5 hours, a gas discharged from the outlet in the condenser was confirmed by FTIR. As a result, the components of the gas were phosphorus pentafluoride, and a small amount of HF. Phosphorus oxyfluorides, such as $POF_3$, were not detected. Subsequently, the blowing of the hydrogen fluoride gas was stopped, and the solution in the container was sampled to measure the concentration of phosphorus. As a result, it was 300 ppm by weight.

Example 7

Into a reaction tank, made of fluorine-contained resin, to the bottom of which a constant-rate pump for taking out was connected, was put 20 kg of an anhydrous hydrogen fluoride solution. While this anhydrous hydrogen fluoride solution was cooled to 10° C., 1 kg of diphosphorus pentaoxide was dissolved therein. Furthermore, the anhydrous hydrogen fluoride solution, in which diphosphorus pentaoxide was dissolved, was supplied to a phosphorus pentafluoride generating tank (made of fluorine-contained resin and having a volume of 10 L). The supply was quantitatively conducted at a rate of 8 kg/hour. The used phosphorus pentafluoride generating tank was a tank to which a condenser of 0° C. and a cooler of −50° C. were connected in series. Additionally, anhydrous hydrogen fluoride of 25° C., generated in a carrier gas generating tank was supplied to the anhydrous hydrogen fluoride solution in the phosphorus pentafluoride generating tank, while bubbling the solution with the gas. The supply of the anhydrous hydrogen fluoride gas was conducted at a rate of 40 kg/hour.

In the phosphorus pentafluoride generating tank, a pump was used, to take out the anhydrous hydrogen fluoride solution to keep the liquid surface of the anhydrous hydrogen fluoride solution at a constant level. The taking-out rate was set to about 8 kg/hour. The liquid temperature of a condensed liquid generated by condensation by the condenser was 20° C., and this condensed liquid was circulated, as it was, into the carrier gas generating tank to be reused. When 30 minutes elapsed, $PF_5$ gas accompanied by a very small amount of HF was constantly generated at a rate of 5.5 g/minute from the outlet in the cooler.

Next, the apparatus illustrated in FIG. 2 was used to make the following operation: Commercially available diethyl carbonate (water concentration: 9 ppm by weight) in a battery grade was charged in an amount of 2603 mL into each of the first tank 2 and the second tank 6 each made of fluorine-contained resin, and then the pumps 3 and 7 were used to start a circulating operation in the individual absorption towers and tanks. At this time, the flow rate of each of the pumps 3 and 7 was set to 1 L/minute. The first cooler 4 and the second cooler 8 were used to set the temperature of the first tank 2 and that of the second tank 6, respectively, to a constant temperature of 20° C.

Subsequently, the above-mentioned hydrogen-fluoride-containing phosphorus pentafluoride gas was supplied into the tower bottom section of the second absorption tower 5 at 5.5 g/minute. The phosphorus pentafluoride gas was allowed to be absorbed into an organic solvent for 2 minutes, and then the supply of lithium fluoride to the second tank 6 at 1.13 g/minute was started. After 60 minutes from the start of the supply of lithium fluoride, a product was taken out at 44.9 mL/minute. At the same time when the product was taken out, an organic solvent was supplied to the first absorption tower 1 at 43.4 mL/minute and further the destination of the solution supply through the pump 3 was switched from the first absorption tower 1 to the second absorption towers. Thereafter, a continuous operation was made.

By the continuous operation for 60 minutes, 2,947.5 g of the solution was continuously supplied to the degassing tower 9. By a reduction in the pressure by the air pump 12, phosphorus pentafluoride gas dissolved excessively in the solution was distilled off. After the distillation-off, the solution was taken out from the third tank 10 to yield 2,911.5 g of a solution of lithium phosphate hexafluoride. Furthermore, from the distilled-off phosphorus pentafluoride gas, diethyl carbonate and HF accompanying the gas were removed through the condenser 13. Thereafter, a separately prepared absorbing liquid in which diethyl carbonate liquid was put was bubbled with the phosphorus pentafluoride gas to allow the gas to be absorbed into the absorbing liquid. In this way, the gas was collected.

In the thus-obtained solution of lithium phosphate hexafluoride in diethyl carbonate, the amount of insoluble components was 10 ppm or less by weight, that of free acids was 10 ppm or less by weight, and that of water was 10 ppm or less by weight. The resultant solution of lithium phosphate hexafluoride in diethyl carbonate was further subjected to a pressure reduction at 40° C. to distill off diethyl carbonate. In this way, a white solid was obtained. The white solid was analyzed by XRD analysis. As a result, it was identified as lithium phosphate hexafluoride.

Example 8

First, the same operation as in Example 7 was made to produce $PF_5$ gas containing a very small amount of HF. Next, the apparatus illustrated in FIG. 2 was used to make the following operation: Commercially available diethyl carbonate (water concentration: 9 ppm by weight) in a battery grade was charged in an amount of 2603 mL into each of the first tank 2 and the second tank 6 each made of fluorine-contained resin, and then the pumps 3 and 7 were used to start a circulating operation in the individual absorption towers and tanks. At this time, the flow rate of each of the pumps 3 and 7 was set to 1 L/minute. The first cooler 4 and the second cooler 8 were used to set the temperature of the first tank 2 and that of the second tank 6, respectively, to a constant temperature of 20° C.

Subsequently, the above-mentioned hydrogen-fluoride-containing phosphorus pentafluoride gas was supplied into the tower bottom section of the second absorption tower 5 at 5.5 g/minute. The phosphorus pentafluoride gas was allowed to be absorbed into an organic solvent for 2 minutes, and then the supply of lithium fluoride to the second tank 6 at 1.13 g/minute was started. After 80 minutes from the start of the supply of lithium fluoride, a product was taken out at 35.9 mL/minute. At the same time when the product was taken out, an organic solvent was supplied to the first absorption tower 1 at 32.5 mL/minute and further the destination of the solution supply through the pump 3 was switched from the first absorption tower 1 to the second absorption tower 5. Thereafter, a continuous operation was made.

By the continuous operation for 60 minutes, 2,380.4 g of the solution was continuously supplied to the degassing tower 9. By a reduction in the pressure by the air pump 12, phosphorus pentafluoride gas dissolved excessively in the solution was distilled off. After the distillation-off, the solution was taken out from the third tank 10 to yield 2,350.5 g of a solution of lithium phosphate hexafluoride. Furthermore, from the distilled-off phosphorus pentafluoride gas, diethyl carbonate and HF accompanying the gas were removed through the condenser 13. Thereafter, a separately prepared absorbing liquid in which diethyl carbonate liquid was put was bubbled with the phosphorus pentafluoride gas to allow the gas to be absorbed into the absorbing liquid. In this way, the gas was collected.

Furthermore, 709.5 g of ethylene carbonate (water concentration: 7 ppm by weight) was added to 2,350.5 g of the resultant solution of lithium phosphate hexafluoride in diethyl carbonate to yield a solution of lithium phosphate hexafluoride in diethyl carbonate/ethylene carbonate. In the resultant solution, the amount of insoluble components was 10 ppm or less by weight, that of free acids was 10 ppm or less by weight, and that of water was 10 ppm or less by weight.

Figure 3:
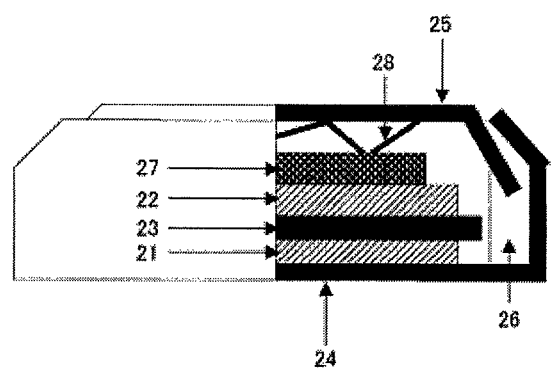
FIG. 3 is an explanatory view which schematically illustrates a cross section of a lithium secondary battery of the invention.

Next, the thus-obtained solution was used to form a coin-shaped nonaqueous electrolytic solution lithium secondary battery illustrated in FIG. 3. Performances thereof as an electrolytic solution were evaluated in a charge-discharge test. Specifically, the test was made in accordance with the following procedure:
<Formation of a Negative Electrode>

Natural graphite and polyvinylidene fluoride (PVdF) were mixed with each other at a ratio by weight of 9/1, and thereto was added N-methylpyrrolidone to yield a paste. An electrode-applying applicator was used to apply this paste evenly onto a copper foil piece 22 μm in thickness. This was vacuum-dried at 120° C. for 8 hours, and then punched out by an electrode punching machine to yield a negative electrode 16 mm in diameter.
<Formation of a Positive Electrode>

$LiCoO_2$ powder, acetylene black as a conductive aid, and PVdF as a binder were mixed with each other at a ratio by weight of 90/5/5, and to this mixture was added N-methylpyrrolidone to yield a paste. An electrode-applying applicator was used to apply this paste evenly onto a copper foil piece 22 μm in thickness. This was vacuum-dried at 120° C. for 8 hours, and then punched out by an electrode punching machine to yield a positive electrode 21 of 16 mm diameter.
<Formation of a Coin-Shaped Nonaqueous Electrolytic Solution Lithium Secondary Battery>

The positive electrode 21 was put onto the bottom face of a positive can 24, and thereon was put a porous separator 23 made of polypropylene. Thereafter, the nonaqueous electrolytic solution prepared in Example 8 was poured hereinto. A gasket 26 was then inserted hereinto. Thereafter, the negative electrode 22, a spacer 27, a spring 28 and a negative can 25 were successively put onto the separator 23. A coin-shaped battery crimping machine was used to fold an opening in the positive electrode can 24 inwards, thereby closing the opening. In this way, a nonaqueous electrolytic solution lithium secondary battery was formed. Subsequently, the batter was charged at a constant current of 0.4 mA. When the voltage reached 4.1 V, the battery was charged at a constant voltage of 4.1 V for 1 hour. The battery was discharged at a constant current of 1.0 mA until the voltage turned to 3.0 V. When the voltage reached 3.0 V, the battery was kept at 3.0 V for 1 hour. In accordance with this charge and discharge cycle, the charge-discharge test was made. As a result, the charge-discharge efficiency was about 100%. When the cycle of the charge and discharge was repeated 150 times, the charging capacity was not changed.

Example 9

First, the same operation as in Example 7 was made to produce $PF_5$ gas containing a very small amount of HF. Next, the apparatus illustrated in FIG. 2 was used to make the following operation: Water-incorporated, commercially available diethyl carbonate (water concentration: 550 ppm by weight) in a battery grade was charged in an amount of 2603 mL into each of the first tank 2 and the second tank 6 each made of fluorine-contained resin, and then the pumps 3 and 7 were used to start a circulating operation in the individual absorption towers and tanks. At this time, the flow rate of each of the pumps 3 and 7 was set to 1 L/minute. The first cooler 4 and the second cooler 8 were used to set the temperature of the first tank 2 and that of the second tank 6, respectively, to a constant temperature of 20° C.

Subsequently, the above-mentioned hydrogen-fluoride-containing phosphorus pentafluoride gas was supplied into the tower bottom section of the second absorption tower 5 at 5.5 g/minute. The phosphorus pentafluoride gas was allowed to be absorbed into an organic solvent for 2 minutes, and then the supply of lithium fluoride to the second tank 6 at 1.13 g/minute was started. From a time after 60 minutes from the start of the supply of lithium fluoride, a product was taken out at 44.9 mL/minute. At the same time when the product was taken out, an organic solvent was supplied to the first absorption tower 1 at 43.4 mL/minute and further the destination of the solution supply through the pump 3 was switched from the first absorption tower 1 to the second absorption tower 5. Thereafter, a continuous operation was made.

By the continuous operation for 60 minutes, 2,947.5 g of the solution was continuously supplied to the degassing tower 9. By a reduction in the pressure by the air pump 12, phosphorus pentafluoride gas dissolved excessively in the solution was distilled off. After the distillation-off, the solution was taken out from the third tank 10 to yield 2,911.5 g of a solution of lithium phosphate hexafluoride. Furthermore, from the distilled-off phosphorus pentafluoride gas, diethyl carbonate and HF accompanying the gas were removed through the condenser 13. Thereafter, a separately prepared absorbing liquid in which diethyl carbonate liquid was put was bubbled with the phosphorus pentafluoride gas to allow the gas to be absorbed into the absorbing liquid. In this way, the gas was collected.

In the thus-obtained solution of lithium phosphate hexafluoride in diethyl carbonate, the amount of insoluble components was 82 ppm by weight, and that of free acids was 380 ppm by weight.

Next, in the same way as in Example 8, the solution of lithium phosphate hexafluoride in diethyl carbonate was used to form a coin-shaped nonaqueous electrolytic solution secondary battery. Furthermore, in the same way as in Example 8, performances thereof as an electrolytic solution were evaluated in a charge-discharge test. As a result, the charge-discharge efficiency was 80%. When the cycle of the charge and discharge was repeated 150 times, it was possible that a decrease in the charging capacity was depressed to a degree of about 20%.

Comparative Example 1

Into a 1-L reaction tank made of fluorine-contained resin were put 5 g of lithium fluoride (LiF) and 100 g of anhydrous hydrogen fluoride (HF) together with a rotator to be dissolved. Next, the 1-L fluorine-contained resin reaction tank was kept at 5° C. in an ice bath. While the solution was stirred with a magnetic stirrer, 25 g of a commercially available 75% phosphoric acid solution in water was dropwise added thereto over 30 minutes. At this time, the temperature of the reaction solution rose up to 35 degrees.

Thereafter, the solution was cooled to −40° C. to crystallize for 12 hours. Next, a supernatant in the 1-L fluorine-contained resin reaction tank was slowly taken out to conduct solid-liquid separation. In this way, a white crystal was yielded. After the separation, $N_2$ was introduced into the reaction tank at 3 L/minute in order to dry and remove hydrogen fluoride adhered onto the crystal. As a result, the white crystal turned to a pasty material. Thereafter, the material was continuously heated in a drying machine of 100° C. for 3 hours to yield a solid appearing to be slightly wet. The solid obtained by the heating treatment was analyzed by ion chromatography. As a result, anions of phosphate oxyfluoride were recognized, the amount of which was 10% by weight.

Comparative Example 2

In present Comparative Example 2, the apparatus illustrated in FIG. 2 was used to produce lithium phosphate hexafluoride.

First, commercially available diethyl carbonate (water concentration: 9 ppm by weight) in a battery grade was charged in an amount of 2603 mL into each of the first tank 2 and the second tank 6 each made of fluorine-contained resin, and then the pumps 3 and 7 were used to start a circulating operation in the individual absorption towers and tanks. At this time, the flow rate of each of the pumps 3 and 7 was set to 1 L/minute. The first cooler 4 and the second cooler 8 were used to set the temperature of the first tank 2 and that of the second tank 6, respectively, to a constant temperature of 20° C.

Next, the HF-containing phosphorus pentafluoride gas yielded in Example 7 was supplied at 5.5 g/minute into the tower bottom section of the second absorption tower 5. This phosphorus pentafluoride gas was caused to be absorbed into an organic solvent for 2 minutes, and then the supply of lithium fluoride into the second tank 6 at 1.34 g/minute was started. After 60 minutes from the start of the supply of lithium fluoride, the second absorption tower 5 was blocked with lithium fluoride, which was in a slurry form. Thus, the operation turned difficult.

The invention claimed is:

1. A process for producing phosphorus pentafluoride, wherein
a carrier gas is brought into contact with either of the following one:
a pentavalent phosphorus compound,
a solution thereof,
or a solution in which a composition resulting from a reaction of the pentavalent phosphorus compound or the solution thereof with hydrogen fluoride is dissolved, thereby a phosphorus pentafluoride is extracted into the carrier gas,
wherein the pentavalent phosphorus compound contains at least one compound selected from the group consisting of phosphorus pentaoxide ($P_2O_5$), orthophosphoric acid ($H_3PO_4$), polyphosphoric acid, metaphosphoric acid, pyrophosphoric acid, triphosphoric acid, isodiphosphate, phosphonic acid, phosphinic acid, phosphenic acid, diphosphonic acid, cyanophosphoric acid, cyanophosphonic acid, diethyldithiophosphinic acid, chlorophenylphosphonic acid, trimethyl phosphate, o-methyl phenylselenophosphinate, pyrophosphonic acid, a phosphorus oxyhalide, phosphorus pentasulfide ($P_2S_5$), phosphorus thiofluoride ($PSF_3$), trichlorophosphine-sulfide ($PSCl_3$), phosphonitrile fluoride ($PNF_2$), phosphonitrile chloride ($PNCl_2$), phosphorus pentabromide, and phosphorus pentaiodide.

2. The process for producing phosphorus pentafluoride according to claim 1, wherein the solution, in which the composition is dissolved, is heated, thereby evaporating phosphorus pentafluoride gas together with hydrogen fluoride gas to separate phosphorus pentafluoride.

3. The process for producing phosphorus pentafluoride according to claim 1, wherein the solution, in which the composition is dissolved, is bubbled with the carrier gas.

4. The process for producing phosphorus pentafluoride according to claim 1, wherein the water content in the carrier gas is 1% or less by weight.

5. The process for producing phosphorus pentafluoride according to claim 1, wherein the temperature when the carrier gas is brought into contact with the solution, in which the composition is dissolved, is from −50 to 100° C.

6. The process for producing phosphorus pentafluoride according to claim 1, wherein the carrier gas is inert to the solution, in which the composition is dissolved.

7. The process for producing phosphorus pentafluoride according to claim 1, wherein the phosphorus atom content in the solution, in which the composition is dissolved, is from 0.01 to 25% by weight.

8. The process for producing phosphorus pentafluoride according to claim 1, wherein hydrogen fluoride gas is used as the carrier gas.

9. The process for producing phosphorus pentafluoride according to claim 1, wherein
the carrier gas is brought into contact with anhydrous hydrogen fluoride,
such that phosphorus oxyfluoride extracted in the carrier gas reacts with anhydrous hydrogen fluoride in accordance with the following chemical formula, and generates phosphorus pentafluoride:

$POF_3 + 2HF \rightarrow PF_5 + H_2O$. 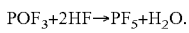

10. The process for producing phosphorus pentafluoride according to claim 1, wherein the pentavalent phosphorus compound is a compound obtained by oxidizing a zerovalent or trivalent phosphorus compound.

11. A process for producing a phosphate hexafluoride, comprising:
producing phosphorus pentafluoride through the process for producing phosphorus pentafluoride according to claim 1, and
reacting the phosphorus pentafluoride with a fluoride in accordance with the following chemical reaction formula, thereby producing the phosphate hexafluoride:

$nPF_5 + MFn \rightarrow M(PF_6)n$ 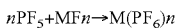

wherein M represents any one selected from the group consisting of Li, Na, K, Rb, Cs, $NH_4$ and Ag when n is 1, represents any one selected from the group consisting of Ca, Mg, Ba, Zn, Cu, and Pb when n is 2, and represents any one selected from the group consisting of Al and Fe when n is 3.

12. The process for producing a phosphate hexafluoride according to claim 11, wherein for the reaction between the phosphorus pentafluoride and the fluoride, at least the following steps are conducted:
 a first step of dissolving phosphorus pentafluoride gas in an organic solvent,
 a second step of adding, to the organic solvent, the fluoride, the amount of which is an amount stoichiometrically equivalent to the phosphorus pentafluoride, or a stoichiometric amount less than the stoichiometrically equivalent amount, thereby generating a solution of the phosphate hexafluoride, and
 a third step of cycling the solution of the phosphate hexafluoride into the first step, thereby dissolving phosphorus pentafluoride gas in the solution of the phosphate hexafluoride instead of the organic solvent.

13. The process for producing a phosphate hexafluoride according to claim 12, wherein the organic solvent is at least either one of a nonaqueous organic solvent or a nonaqueous ionic liquid.

14. The process for producing a phosphate hexafluoride according to claim 12, wherein the organic solvent is a solvent having a water concentration of 100 ppm or less by weight.

15. The process for producing a phosphate hexafluoride according to claim 12, wherein the first and third steps are conducted, using an absorption tower.

* * * * *